J. I. SIGLER.
Thrashing Machine.
No. 23,647.
2 Sheets—Sheet 1.
Patented April 12, 1859.
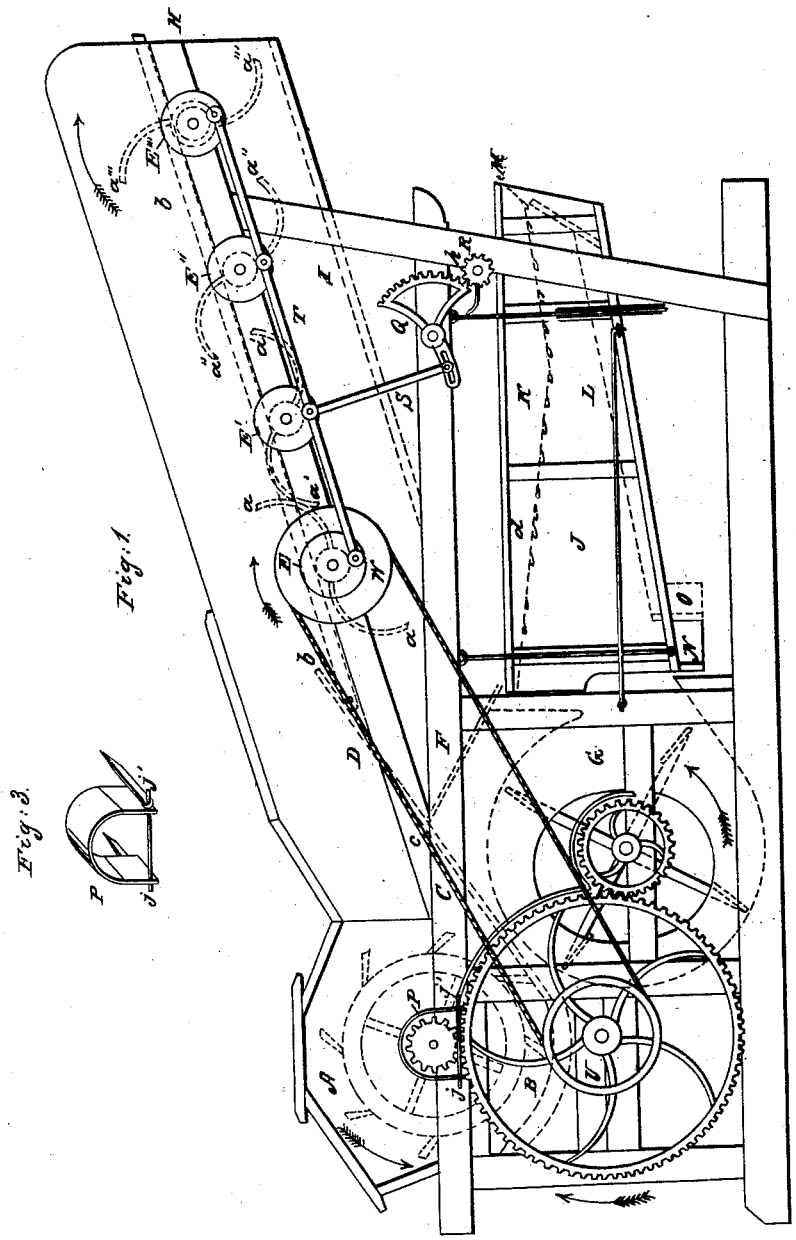

J. I. SIGLER.
Thrashing Machine.
No. 23,647.
2 Sheets—Sheet 2.
Patented April 12, 1859.
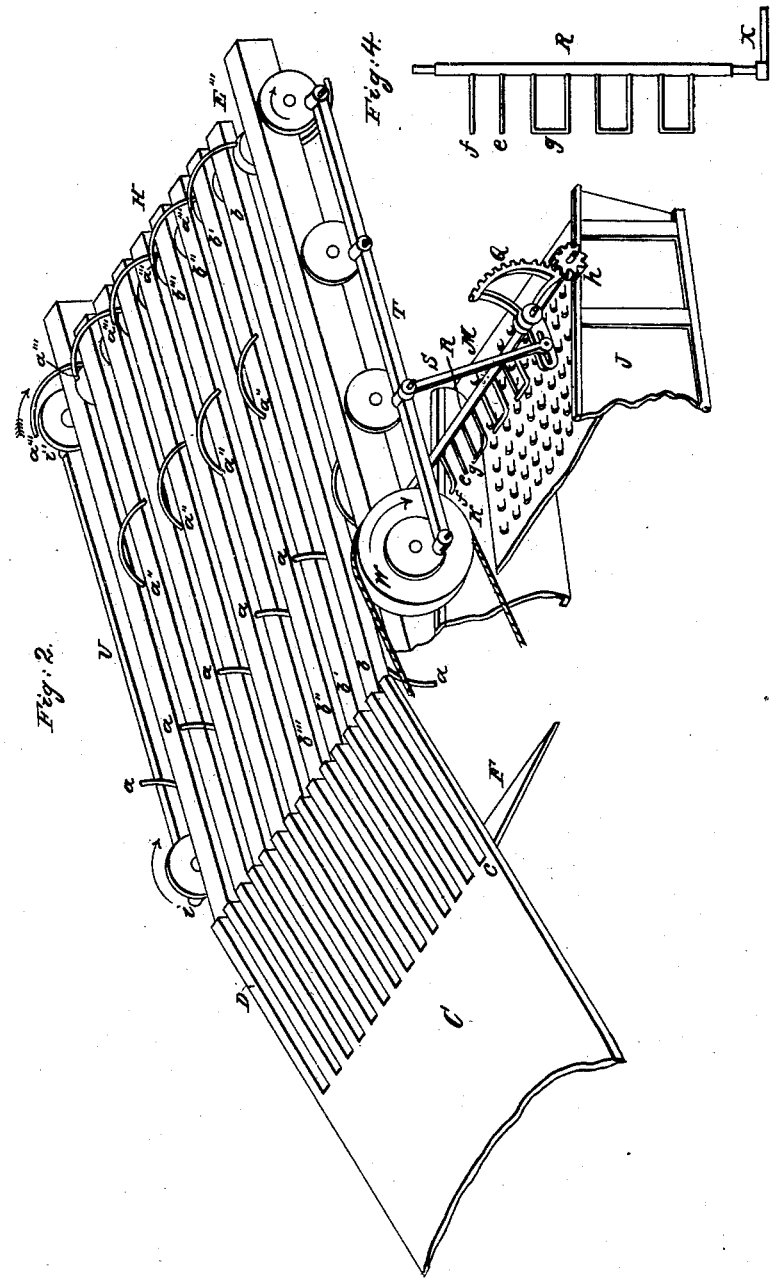

UNITED STATES PATENT OFFICE.

JOHN I. SIGLER, OF MARTINS FERRY, OHIO, ASSIGNOR TO HIMSELF AND W. M. GRIFFITH & CO., OF SAME PLACE.

THRESHING-MACHINE.

Specification of Letters Patent No. 23,647, dated April 12, 1859.

*To all whom it may concern:*

Be it known that I, JOHN I. SIGLER, of Martins Ferry, in the county of Belmont, in the State of Ohio, have made certain Improvements in Machinery Used for the Purpose of Threshing and Cleaning Grain; and I do hereby declare that the following is a full and exact description thereof, reference being had to the accompanying drawings, forming a part of this specification.

The nature of my invention consists, first, in the application of a series of revolving rollers, into which fingers or teeth are inserted, in combination with a system of slats, for the purpose of carrying the straw from the threshing cylinder to the place of deposit, and at the same time effectually separating the grain therefrom; secondly, in the application of an oscillating shaft, provided with fingers or rods, or staples, to aid in the separation of the grain from the chaff at the tail of the riddle in the cleaning shoe; and to enable others skilled in the art to make and use my invention, I will proceed to describe its construction and operation.

Like parts in the different figures are represented by identical letters.

Figure 1 is a whole-length elevation of the driving side of the machine. Fig. 2 is a perspective section, exhibiting the arrangement of the chutes, straw carrier, a portion of the cleaning shoe, etc. Fig. 3 is a perspective view of the guard or shield over cylinder pinion. Fig. 4 shows the oscillating shaft with a modification hereafter described.

The grain to be threshed is made to pass between the teeth or spikes of the revolving cylinder A, and those of the fixed concave B. After leaving the threshing cylinder, and by the force thereby communicated, the straw and grain are thrown indiscriminately up the ascending chute C, the upper portion of which D above $c$, Fig. 2, is furnished with longitudinal interstices or openings, which permit the greater portion of the grain to pass through and fall upon the chute F, and thus descend to the vibrating cleaning shoe J. The straw after arriving at the summit of the chute C—D lodges on the device $b\ b'\ b''$, etc. This device consists of a series of slats placed at a suitable distance apart and extending from near the termination of chute C—D to the point at which it is desired to deposit the straw. The straw being thrown upon this device is operated upon by the fingers of the series of revolving rollers E E' E'' E''', the rollers being adjusted in such a manner that when the fingers $a$ in roller E shall have descended below the surface of the slat device $b, b$, the fingers $a'$ in the succeding roller E' shall immediately emerge above; that when these fingers, in turn, descend below, those of the succeeding roller E'' shall emerge above said surface, and so on to the last. By this arrangement the straw is carried to the place of discharge by a succession of impulses, which secures an effectual separation of the remaining grain, which drops through the interstices between the slats $b\ b'\ b''$, etc., and falling upon the inclined return bottom I, by the inclination of which (aided by the motion of the fingers $a\ a'$, etc., in the lower portion of their revolution) it is carried toward the cleaning shoe. The grain thus separated, together with that previously separated by means of the interstices in chute D and discharged by the descending chute F, is thrown upon the laterally vibrating shoe J, near $d$, and is subjected to the action of the blast from the fan G; the greater portion of the grain, by its gravity, passing through the apertures in the riddle K, whence falling upon the screen L, it is carried into, and discharged from the clean grain spout N; the smaller heavy impurities, or tailings, passing through the meshes in said screen L, pass over the bottom of the shoe J into the tailings spout O; the chaff, and other light matter, by the blast from the fan G, being blown off at the surface of the riddle K in the direction of M. At the tail of the shoe the chaff, if very foul, has a tendency to accumulate, which prevents the grain carried to that point from passing into the shoe. In order to obviate this difficulty, I employ the oscillating shaft R. This shaft I furnish with a suitable number of straight $e$, curved $f$, or stapled $g$ fingers (Figs. 2 and 4). It is mounted immediately over the tail of the upper riddle or screen K, and is made to oscillate in any required arc of a circle by means of the pinion $h$, rack-segment and arm Q, the required motion being obtained from a suitable point by means of the connecting rod S. Under this arrangement I secure an oscillation of any required number of degrees, and which may be increased or diminished according to the amount of motion required to free the apertures in the tail of the riddle from obstruction. Should an oscillation of less than 180 degrees be desired I dispense with the pinion $h$ and rack-segment Q, and connect the rod S with an arm H placed on shaft R, Fig. 4.

The first roller of the series, E, is driven by means of a strap passing over pulleys V and W, the remaining rollers, after being suitably adjusted, being connected and driven by means of the connecting rod T, working on a crank pin on the end of each roller; the connecting rod U, Fig. 2 being used for the purpose of carrying the cranks over the dead centers; the cranks $i$ $i'$ being placed at right angles to those of the opposite ends of the rollers for that purpose.

It is not deemed necessary to describe minutely the threshing cylinder A, concave B, fan G, vibrating shoe, riddle K, etc., nor the particular mode of giving them motion, as they may be constructed and operated in any of the ways now practiced.

The cylinder pinion guard or shield consists of a metallic cover P, Figs. 1–3, conforming to the contour of the upper portion of the pinion, running down in the form of ∩ and being hinged at its lower forward angles $j$ $j'$, so that it can be thrown downward when it is desired to remove or get at the cylinder. Extraneous matter is thus prevented from coming in contact with the flooring, the operator is protected from danger while oiling the journal, etc., while at the same time the cylinder admits of removal from its bearings without detaching the guard.

I do not claim the series of rollers used for the purpose of carrying and agitating the straw. I am aware that rollers furnished with spikes have been previously used for this purpose. My invention consists in the combination of the series of fingered rollers E E' E'' E''', etc., with the slat device $b$, $b'$ $b''$, etc. Secondly, I am aware that a shaft provided with teeth or fingers and having a continuous circular motion has been used for the purpose of agitating the chaff and other matter which accumulates at the tail of the riddle K (pat. by W. H. Orr, July 13th 1858.) My invention consists in the application of the fingered shaft made to oscillate in any required angle less than 360 degrees, by which application I secure an agitation inwardly toward the fan in addition to that outwardly toward the place of discharge M obtained by the continuous circular motion above noticed.

Having thus fully described the nature of my improvements in machinery for threshing and cleaning grain and shown the operation thereof, what I claim therein as new, and desire to secure by Letters Patent, is—

1. The series of rollers E' E'' E''', etc., provided with fingers or projections $a$ $a'$ $a''$, etc., in combination with the slat device $b$ $b'$ $b''$, the fingers working in the spaces between the slats and being used for the purpose of carrying the straw from the threshing cylinder to the place of discharge H, and at the same time so tossing it as to secure an effectual separation of the grain therefrom, the slat device $b$ $b'$, etc., being employed for the purpose of supporting the body of the straw between the impulses of the fingers $a$, $a'$, etc., and also for the purpose of preventing the straw from winding on the rollers E E', etc.

2. I claim the application of the oscillatory motion to the fingered shaft R, by means of which I secure an agitation inwardly toward the fan G, in addition to the throw toward the place of discharge M, for the purpose of more effectually freeing the apertures near the tail of the riddle K from obstructions, the required motion being obtained by means of the pinion $h$, rack-segment Q and arm H, or their equivalents.

JOHN I. SIGLER.

Witnesses:
I. B. FARIS,
CALVIN DAILEY.